(12) United States Patent
Billiani et al.

(10) Patent No.: US 9,988,533 B2
(45) Date of Patent: Jun. 5, 2018

(54) AQUEOUS BINDER COMPOSITIONS

(75) Inventors: Johann Billiani, Graz (AT); Philippe Deligny, Waterloo (BE); Gerhard Reidlinger, Graz (AT); Anton Arzt, Neu-Tillmitsch (AT); Florian Lunzer, Graz (AT)

(73) Assignees: ALLNEX BELGIUM S.A., Drogenbos (BE); ALLNEX AUSTRIA GMBH, Werndorf (AT)

( * ) Notice: Subject to any disclaimer, the term of this patent is extended or adjusted under 35 U.S.C. 154(b) by 514 days.

(21) Appl. No.: 14/127,239

(22) PCT Filed: Jul. 24, 2011

(86) PCT No.: PCT/EP2011/062694
§ 371 (c)(1),
(2), (4) Date: Jan. 14, 2014

(87) PCT Pub. No.: WO2013/013701
PCT Pub. Date: Jan. 31, 2013

(65) Prior Publication Data
US 2014/0135442 A1 May 15, 2014

(51) Int. Cl.
| | |
|---|---|
| *C08L 75/14* | (2006.01) |
| *C08G 18/65* | (2006.01) |
| *C08G 18/66* | (2006.01) |
| *C08G 18/68* | (2006.01) |
| *C08G 18/75* | (2006.01) |
| *C08G 18/76* | (2006.01) |
| *C08G 18/08* | (2006.01) |
| *C09D 175/14* | (2006.01) |
| *C08G 18/34* | (2006.01) |
| *C08G 18/40* | (2006.01) |
| *C08L 33/06* | (2006.01) |

(52) U.S. Cl.
CPC .......... *C08L 75/14* (2013.01); *C08G 18/0823* (2013.01); *C08G 18/0866* (2013.01); *C08G 18/348* (2013.01); *C08G 18/4018* (2013.01); *C08G 18/6517* (2013.01); *C08G 18/6622* (2013.01); *C08G 18/68* (2013.01); *C08G 18/758* (2013.01); *C08G 18/7621* (2013.01); *C08G 18/7642* (2013.01); *C08L 33/06* (2013.01); *C09D 175/14* (2013.01)

(58) Field of Classification Search
CPC ..... C08L 75/14; C08L 33/06; C08G 18/0823; C08G 18/0866; C08G 18/348; C08G 18/4018; C08G 18/6517; C08G 18/6622; C08G 18/68; C08G 18/758; C08G 18/7621; C08G 18/7642; C09D 175/14
See application file for complete search history.

(56) References Cited

U.S. PATENT DOCUMENTS

| | | | |
|---|---|---|---|
| 4,977,209 A | 12/1990 | Barker et al. | |
| 6,166,150 A * | 12/2000 | Wilke ................. | C08F 283/002 524/457 |
| 6,610,784 B1 | 8/2003 | Overbeek et al. | |
| 6,627,700 B1 * | 9/2003 | Kadambande ........ | C08F 283/01 523/522 |
| 2007/0260022 A1 * | 11/2007 | Casteren Van ..... | C08G 18/0852 525/453 |
| 2008/0319141 A1 * | 12/2008 | Reidlinger ......... | C08G 18/0823 525/440.07 |
| 2010/0197851 A1 * | 8/2010 | Breiner ................ | C09D 133/08 524/507 |

FOREIGN PATENT DOCUMENTS

| | | |
|---|---|---|
| EP | 0 267 562 | 5/1988 |
| EP | 0 350 157 | 1/1990 |
| EP | 0 379 158 | 7/1990 |
| EP | 0 421 609 | 4/1991 |
| EP | 0 458 243 | 11/1991 |
| EP | 0 580 163 | 1/1994 |
| EP | 1 435 370 | 7/2004 |
| EP | 1 477 236 | 11/2004 |
| EP | 1 852 478 | 11/2007 |
| EP | 1 887 060 | 2/2008 |
| EP | 1 958 995 | 8/2008 |
| EP | 2 009 071 | 12/2008 |
| GB | 2 100 271 | 12/1982 |
| WO | 2010/040844 | 4/2010 |

OTHER PUBLICATIONS

International Search Report dated Oct. 18, 2011 in International (PCT) Application No. PCT/EP2011/062694.
Wicks et al., "Autoxidizable urethane resins", Progress in Organic Coatings, vol. 54, 2005, pp. 141-149.

* cited by examiner

*Primary Examiner* — Michael L Leonard
(74) *Attorney, Agent, or Firm* — Wenderoth, Lind & Ponack, L.L.P.

(57) ABSTRACT

The invention relates to mixtures of at least one acrylic resin dispersion A and a second dispersion B which is at least one of a polyurethane dispersion B1 which comprises, in its polymer, moieties derived from grafted fatty acids, and a mixture B2 of a polyurethane dispersion B21 and an aqueously dispersed alkyd resin B22, and to a method of use thereof for coating of porous substrates.

11 Claims, No Drawings

AQUEOUS BINDER COMPOSITIONS

FIELD OF THE INVENTION

The invention relates to aqueous binder compositions, to a process for their preparation, and to a method of use thereof.

BACKGROUND OF THE INVENTION

Aqueous binders have been used for a variety of purposes, particularly for the preparation of coating compositions, adhesives, and impregnants. In these applications, the binders have various functions, such as sealing of pores in a porous substrate, or film formation on the surface of a substrate, which film may serve as protective layer or as functional layer such as adhesion layer, decorative layer, reflective layer, thermally insulating layer, or layer with certain electric or magnetic properties.

The chemical nature of the binder is decisive for the adhesion, mechanical, and chemical properties of the film or layer formed. While there is a certain range of properties available for a specific chemical system by modification of the basic polymer, determined by the kind of polymer formed in the crosslinking reaction that leads to a solid film or layer, it is frequently desired to be able to tailor the properties of the polymers formed in the crosslinking reaction in a way of combining e.g. the gloss of an alkyd resin, the lightfastness of an aliphatic polymer such as aliphatic acrylate copolymers, the corrosion protection of an epoxy resin system, the scratch resistance of silicones, and the mechanical and chemical resistance of polyurethanes.

STATE OF THE ART

Combinations of aqueous dispersions of polyurethane resins and of acrylic resins have been described in EP 0 350 157 A2. These dispersions are made from an aqueous polyurethane dispersion, an aqueous acrylic resin dispersion, and a further dispersion made by radically polymerising a mixture of acrylic monomers in the presence of the first-mentioned polyurethane resin dispersion. The polyester polyol used in this document may made by reacting an unsaturated carboxylic acid with a glycol component, which embodiment provides a functional bond between with the radically polymerisable acrylic monomers. If hydrazine is used for chain extension of the polyurethane, reaction of the hydrazine groups with carbonyl or carboxamido group of the acrylic polymer occurs during or after film formation. As hydrazine presents an environmental and toxicological problem, however, such systems cannot be used broadly.

A base-coat composition comprising an aqueous acrylic resin and a urethane resin emulsion has been known from EP 0 379 158 A2. An aqueous acrylic resin is admixed to a urethane resin emulsion, wherein the acrylic resin has an acid number of from 20 mg/g to 150 mg/g, and a number-average molar mass of from 5 kg/mol to 30 kg/mol. The urethane resin is made by reacting in a solvent an aliphatic or alicyclic diisocyanate, a polyether diol or a polyester diol, a low molar mass polyhydroxy compound, and a dimethylolalkanoic acid, neutralisation and dispersing in water, under chain extension with water, and optionally, removal of the solvent. The two resins are mixed in a ratio of the mass $m_A$ of acrylic resin to the mass $m_U$ of polyurethane resin, the mass in each case being the mass of the solid resin, of from 12/88 to 1/99 as it had been found that the water resistance is impaired if the mass fraction of the acrylic resin exceeds 12%, and that the pigments added to the mixed dispersion are not held stably in a dispersed state if the mass fraction of acrylic resin is reduced to below 1%. The base coat is cured together with a clearcoat, with an isocyanate crosslinker.

In EP 0 421 609 A2, a water-based acrylic coating composition is disclosed the binder of which comprises mass fractions of from 60% to 90% of an acrylic copolymer and from 10% to 40% of a polyurethane. The acrylic copolymer is made in an emulsion polymerisation process and comprises mass fractions of from 1% to 10% of moieties derived from one or both of methylol methacrylamide and methylol acrylamide.

Aqueous coating compositions comprising an acrylic copolymer and a urethane oligomer dispersion are also described in EP 0 458 243 A1. The acrylic copolymer has a number-average molar mass of from 6 kg/mol to 50 kg/mol, and has amide groups, acid groups, and hydroxyl groups, and the urethane oligomer is derived from a hydroxyl group terminated diol, a diisocyanate compound, active hydrogen-containing hydrophilic compounds, and the prepolymer made therefrom is neutralised and chain-extended in an aqueous medium comprising primary or secondary polyamines. The mass fraction of the acrylic copolymer in the binary mixture is from 95% to 10%, the mass in each case being the mass of the solid resin. The mixture of the two resin dispersions is crosslinked with a melamine-formaldehyde resin.

In EP 0 580 163, an aqueous coating composition is disclosed which comprises an acrylic resin emulsion, and a urethane emulsion, a crosslinking agent, and an acidic phosphate or phosphite ester. The acrylic resins have an acid number of from 20 mg/g to 150 mg/g and a number-average molar mass of from 5 kg/mol to 30 kg/mol. The urethane emulsion is made by first synthesising a urethane prepolymer from an aliphatic or cycloaliphatic diisocyanate, a polyether diol or polyester diol having a number-average molar mass of from 500 g/mol to 5 kg/mol, a low molar mass polyhydroxyl compound, and a dimethylol alkanoic acid. This prepolymer is mixed with water after or during neutralisation of the prepolymer with a tertiary amine, and the resulting mixture is chain-extended by water. The organic solvent used during the prepolymer formation is then distilled off. Melamine formaldehyde resins and phenol formaldehyde resins are useful as crosslinkers. The ratio of the mass $m_A$ of acrylic resin to the mass $m_U$ of urethane resin is between 90 kg/10 kg to 60 kg/40 kg, and the ratio of the sum of the mass $m_A$ of acrylic resin and the mass $m_U$ of urethane resin to the mass $m_C$ of crosslinker resin $(m_A+m_U)/m_C$ is between 95 kg/5 kg and 60 kg/40 kg, masses of resins always being the mass of the solid resin present in the emulsion or dispersion. The acidic phosphate or phosphite ester has the general formula HO—P(O)(OR$^1$)(OR$^2$) or HO—P(OR$^1$)(OR$^2$).

A water-based coating composition the binder of which comprises an acrylic silane copolymer with an acid number of from 2 mg/g to 100 mg/g and a hydroxyl number of up to 100 mg/g, a glass transition temperature of from −40° C. to 25° C. and a weight average molar mass of from 500 kg/mol to 3000 kg/mol, and a polyurethane which may be a polyester urethane, a polyether urethane, or a polyacrylourethane, comprising moieties derived from a compound having groups that are reactive with isocyanate groups, and groups capable of forming an anion. In the acrylic copolymer, moieties derived from a silane acrylate or methacrylate of formula

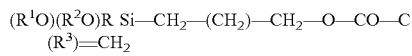
$(R^3)=CH_2$ is present in a mass fraction of from 1% to 10%. These coating compositions are used as base coats which are cured at ambient temperature for twenty-one days.

In EP 1 435 370 A1, a coating composition is disclosed which comprises an emulsion of an acrylic copolymer, an aqueous urethane resin, a wax emulsion, an alkaline soluble resin, and a UV absorber. The resins are only defined in very general terms, by reciting monomers that may be used, and by reference to trade names in the examples with no explanation of composition nor values of characteristic parameters.

A three-coat one-bake film forming method is disclosed in EP 1 477 236 A1 where onto an electrodeposited coating film, an intermediate paint, a base paint, and a clear paint are applied one after the other, and cured by application of heat after the last layer has been applied. The intermediate paint comprises a urethane-modified polyester resin having a number average molar mass of from 1.5 kg/mol to 3 kg/mol, a melamine crosslinker resin, a blocked isocyanate where the blocking agent has an activated methylene group, and a non-aqueous dispersion of an acrylic resin having a core-shell structure.

An aqueous paint composition which is used in formation of a multilayered film has been disclosed in EP 1 852 478 A1, where the second aqueous paint of three consecutively-applied paint layers is comprised of an emulsion polymer of a monomer mixture which comprises a cross-linking vinyl monomer a carboxyl group-containing vinyl monomer, a hydroxy group-containing vinyl monomer, and further polymerisable vinyl monomers, a water-soluble acrylic resin which contains amide groups, a urethane emulsion and a curing agent, wherein the first-named emulsion polymer has a core-shell structure. Hybrid resins for airbag coatings are known from EP 1 887 060 A1, which hybrid resins are urethanes blended with acrylate resins, vinyl resins, silicone resins, and combinations thereof, at least one of the components having a glass transition temperature of 20° C. or less. The urethanes are preferably of the polycarbonate, polytetramethylene glycol, silicon-based diol, or olefin-based diol type, and are made from these components together with an aliphatic diisocyanate and a carboxylic or sulphonic acid also having two hydroxy groups. These resins are said to form an interpenetrating network.

Aqueous coating compositions having a mixture of a urethane based resin, a chlorinated polyolefin resin, and optionally, also an acrylic-based resin, have been described in EP 1 958 995 A2. All resins are described in very general terms. While the polycarbonate based polyurethane resin used in the examples is identified not only by trade name, but also by elongation at break and tensile strength of a film made therefrom, measured on a non-specified sample with a non-specified test method, the acrylic based resin is only identified by a trade name.

An aqueous primer composition has been disclosed in EP 2 009 071 A1. This primer comprises a modified polyolefin dispersion, an aqueous urethane resin and/or aqueous acrylic resin, a conductive metal oxide, and aluminium flakes. The urethane resin is described in the specification in very general terms, and no specific information can be drawn from the examples as the urethane resin is only identified by its trade name.

None of the cited documents discloses combinations of polyurethane resins, acrylic resins and alkyd resins. There is also no suggestion of incorporating an alkyd resin moiety or oil-based moiety into a polyurethane resin and admixing this modified polyurethane resin to an acrylic resin dispersion.

SUMMARY OF THE INVENTION

It has been found in the experiments that have led to the present invention that combinations of polyurethane resins, alkyd resins, and acrylic resins, in the form of their aqueous dispersions, and, in the alternative, combinations of polyurethane resins comprising moieties derived from grafted fatty acids, with acrylic resins, both in the form of their aqueous dispersions, lead to binders for coating compositions have a desirable combination of application properties with the advantageous features of all components.

The invention therefore relates to mixtures of at least one acrylic resin dispersion A and a second dispersion B which is at least one of a polyurethane dispersion B1 which comprises, in its polymer, moieties derived from grafted fatty acids, and a mixture B2 of a polyurethane dispersion B21 and an aqueously dispersed alkyd resin B22.

The invention further relates to a process of making mixtures of at least one acrylic resin dispersion A and a second dispersion B, and to a method of use of these mixtures to prepare binders for coating compositions.

DETAILED DESCRIPTION OF THE PREFERRED EMBODIMENTS

The acrylic dispersion A preferably has a minimum film forming temperature of less than 35° C., corresponding to a glass transition temperature of up to 30° C., a hydroxyl number of from 0 mg/g to 50 mg/g, and an acid number of from 2 mg/g to 25 mg/g, which are made by emulsion copolymerisation of at least two olefinically unsaturated monomers A1 and A2. Usually, at least one of the olefinically unsaturated monomers A1 and A2 is an acrylate or a methacrylate which gives the name of "acrylic dispersion" to A. The acrylic dispersions A preferably have particle sizes from 50 nm to 300 nm, particularly preferably from 70 nm to 250 nm, and especially preferred, from 90 nm to 180 nm. The mass fraction of solids in the dispersions is preferably from 33% up to 55%.

The monomers A1 are selected from the group consisting of olefinically unsaturated monomers that have no functional group other than olefinic double bonds, i. e. those monomers that are free from hydroxyl groups, amino groups, mercapto groups, epoxide groups, and acid groups, which monomers A1 are selected from the group consisting of esters A11 of olefinically unsaturated carboxylic acids with monohydroxy compounds such as aliphatic linear branched, or cyclic alcohols, of olefinically unsaturated aromatic compounds A12 having at least one olefinically unsaturated aliphatic substituent on an aromatic residue derived from optionally substituted aromatic compounds by removal of a hydrogen atom bonded to an aromatic ring, of olefinically unsaturated esters A13 of an unsaturated aliphatic alcohol and a saturated aliphatic carboxylic acid, of ethers A14 of the formula $R^1$—O—$R^2$, wherein both $R^1$ and $R^2$ are linear or branched aliphatic radicals having from one to twenty carbon atoms, and at least one of $R^1$ and $R^2$ is olefinically unsaturated in which case the number of carbon atoms is at least two, of unsaturated aliphatic ketones A15 of the formula $R^3$—CO—$R^4$, wherein both $R^3$ and $R^4$ are linear or branched or cyclic aliphatic radicals having from one to twenty carbon atoms, and at least one of $R^3$ and $R^4$ is olefinically unsaturated in which case the number of carbon atoms is at least two, and of unsaturated aliphatic halogenides and nitriles A16 of the formula $R^5$—X where X is F, Cl, Br, I, or CN, and $R^5$ is an unsaturated aliphatic radical having from two to twenty carbon atoms, where it is also possible that more than one hydrogen atom of the olefinically unsaturated aliphatic compound $R^5$—H are substituted by atoms or groups X.

Preferred monomers A11 are esters of olefinically unsaturated carboxylic acids with aliphatic alcohols having from one to twenty carbon atoms, particularly, methyl (meth) acrylate, ethyl (meth)acrylate, the isomeric propyl (meth) acrylates, the isomeric butyl (meth)acrylates, 2-ethylhexyl (meth)acrylate, decyl (meth)acrylate, tridecyl (meth)acrylate, and stearyl (meth)acrylate, where (meth)acrylate stands for either acrylate or methacrylate. Other useful monomers A11 are diesters of olefinically unsaturated dicarboxylic acids with aliphatic alcohols having from one to twenty carbon atoms, such as diesters of maleic, fumaric, itaconic, citraconic and mesaconic acids, with methanol, ethanol, butanol, n- and isopropanol, n-, iso-, sec.- and tert.-butanol, 2-ethylhexanol, decanol, tridecanol and stearylalcohol, as well as mixed esters of these.

Preferred monomers A12 are dimethyl maleinate, diethyl maleinate, dimethyl fumarate, and diethyl fumarate.

Preferred monomers A13 are vinyl and allyl esters of aliphatic linear or branched monocarboxylic acids such as vinyl acetate, vinyl propionate, vinyl 2-ethylhexanoate, vinyl neopentanoate, vinyl pivalate, and vinyl neodecanoate, and the commercially available mixture of vinyl esters of alpha-branched decanoic acids ("®Versatic acid") as well as the analogous esters of allyl and methallyl alcohols.

Preferred monomers A14 are styrene, the isomeric mixture of vinyl toluenes, 4-vinyl pyridine, and 2-vinylnaphthalene.

Preferred monomers A15 are ethers of vinyl and of allyl alcohols with saturated aliphatic linear or branched alcohols having from one to twenty carbon atoms such as methyl vinyl ether, ethyl vinyl ether, n- and iso-butyl vinyl ether, methyl allyl ether, and propyl allyl ether.

Preferred monomers A16 are olefinically unsaturated ketones, particularly ketones that have one vinyl or allyl group, and one linear or bached or cyclic aliphatic group having from one to twenty carbon atoms, such as methyl vinyl ketone, ethyl vinyl ketone, and n-propyl vinyl ketone.

The monomers A2 have additional functionalities next to being olefinically unsaturated, which functionalities are preferably selected from the group consisting of acid, hydroxyl, and acid amide, where the acid functionalities may be carboxylic acid —COOH, sulphonic acid-$SO_2OH$, sulphuric acid —O—$SO_2OH$, phosphonic acid —$PO(OH)_2$, phosphoric acid —O—$PO(OH)_2$, and the acid amide functionalities may be those of the corresponding amides.

One group of monomers A21 which belong to group A2 are acid-functional olefinically unsaturated monomers which have at least one acid group which may preferably be a carboxylic acid group, —COOH, a sulphonic acid group —$SO_3H$, a sulfinic acid group —$SO_2H$, and a phosphonic acid group —$PO(OH)_2$. Useful monomers A21 are acrylic acid, methacrylic acid, maleic acid, fumaric acid, the half esters of maleic or fumaric acid, vinyl sulphonic acid, vinyl phosphonic acid, and allyloxy hydroxypropyl sulphonic acid, as well as salts of these.

Another group of monomers A22, which belong to the group A2 are hydroxyalkyl esters of the monomers listed in the group A21, such as hydroxyethyl (meth)acrylate, hydroxypropyl (meth)acrylate, and hydroxybutyl (meth) acrylate.

Another group of monomers A23, which belong to the group A2 are acid amides based on the acid monomers A21 such as (meth)acrylamide, N,N-dimethyl (meth)acrylamide and homologues thereof.

Further optional monomers are the monomers A3 that contribute to improving the adhesion of coatings prepared with the acrylic copolymers comprising these optional monomers to substrates coated. These optional monomers A3 are olefinically unsaturated and carry additional groups which may be trialkyl silane groups, trialkoxysilane groups, mixed alkyl/alkoxysilane groups, ureido groups, beta-keto acid groups, or beta-hydroxy acid groups. Particularly preferred are vinyl trimethoxysilane, vinyl dimethoxymethylsilane, vinyl tris(2-methoxyethoxy)-silane, (methacryloxymethyl)-methyldimethoxysilane, trimethoxysilane (meth)acrylate, 2-ethyl (2-oxoimidazolidin-1-yl) methacrylate, 2-ethyl (2-oxoimidazolidin-1-yl) (meth)acrylate, acetoacetoxyethyl (meth)acrylate, beta-ketoglutaric acid vinyl ester, and beta-hydroxybutyric acid allyl ester.

The mass fraction of moieties derived from monomers A1 in the polymer A, calculated as the ratio of the mass $m_{A1}$ of monomers A1 and the mass $m_A$ of the polymer A, is preferably from 80% to 99.5%, particularly preferably, from 85% to 99%. The mass fraction of moieties derived from monomers A2 in the polymer A, calculated as the ratio of the mass $m_{A2}$ of all monomers of group A2 present in the monomer mixture and the mass $m_A$ of the polymer A, is preferably from 0.5% to 20%, particularly preferably, from 1% to 15%. The mass fraction of moieties derived from monomers A3 which are optionally also present in the polymer A, calculated as the ratio of the mass $m_{A3}$ of monomers A3 and the mass $m_A$ of the polymer A, is preferably from 0.1% to 7%, particularly preferably, from 0.5% to 5%, and especially preferred, from 1% to 4%.

The minimum film forming temperature (MFT) of the polymer A, as measured in accordance with DIN 53787 and DIN 53 366 (ISO 2115) is preferably between −5° C. and 35° C. In a preferred embodiment, the MFT may be in the range of from 0° C. to 20° C.

The abbreviation "(meth)acryl" stands for either or both of acryl and methacryl.

The second aqueous dispersion B is at least one of a polyurethane dispersion B1 which comprises, in its polymer, moieties derived from oils or alkyd resins, or both, and a mixture B2 of a polyurethane dispersion B21 and an aqueously dispersed alkyd resin B22.

The aqueous polyurethane dispersion B1 comprises in its polymer a moiety derived from a polyfunctional isocyanate, a moiety derived from at least one polyhydric alcohol having at least two hydroxyl groups, a moiety derived from at least one fatty acid, and a moiety derived from a hydroxyfunctional compound made from a grafted fatty acid which in turn is made from a fatty acid having at least one olefinic unsaturation, and grafted with a mixture of olefinically unsaturated monomers which mixture comprises at least one acid-functional olefinically unsaturated monomer, wherein the grafted fatty acid has on average at least 1.1 acid groups per molecule. This aqueously dispersed polyurethane B1 is preferably made in a multi-step reaction, where in the first step, a fatty acid having at least one olefinic unsaturation is grafted with a mixture of olefinically unsaturated monomers which mixture comprises at least one acid-functional olefinically unsaturated monomer, to provide a grafted fatty acid having on average at least 1.1 acid groups per molecule, in the second step, a compound which is hydroxy-functional is made by reacting with the said grafted fatty acid at least one polyhydric alcohol having at least two hydroxyl groups, at least one fatty acid, and optionally, at least one polyfunctional acid having at least two acid groups, and/or an anhydride thereof, and in the third step, a polyurethane is made by reacting the hydroxy functional compound with a polyfunctional isocyanate, and optionally, a low molar mass polyhydric alcohol having a molar mass of up to 2000 g/mol and at least two hydroxyl groups per molecule, and further optionally, a polymeric polyol having at least two hydroxyl groups per molecule, and which is derived from a polyester, a polyacrylate, a polycarbonate, a polyether, or an olefin polymer and further optionally, a dihydroxyalkanoic acid having a sterically hindered acid group where the carbon atom carrying the carboxyl group is a tertiary or quaternary carbon atom. In a further step, the product of the third step is reacted with at least one chain extender, having at least two functional groups that react with isocyanate groups, and optionally, at least one of monofunctional compounds also referred to as chain stoppers that have only one group that is reactive towards isocyanate groups, and of compounds that have at least two different kinds of groups that have different reactivity towards isocyanate groups, selected from the group consisting of primary hydroxyl groups —$CH_2OH$, secondary hydroxyl groups >CH(OH), tertiary hydroxyl groups >C(OH)—, primary amino groups —NH2, secondary amino groups >NH, and mercapto groups —SH, which are used to impart additional functional groups into the polyurethane.

In the reaction of the third step between the hydroxy functional compounds and the poly-functional isocyanate, the stoichiometry has to be selected in a way to make a polyurethane, i. e. the amount of substance n(—NCO) of isocyanate groups in the polyfunctional isocyanate has to be at least 0.9 of the sum of the amounts of substance n(—OH) of hydroxyl groups in the hydroxyfunctional compounds employed in the third step, in other words, the ratio n(—NCO)/n(—OH) 0.9 mol/mol, but preferably not more than 1.3 mol/mol. Preferably, this ratio n(—NCO)/n(—OH) is at least 1.05 mol/mol, and with particular preference, at least 1.1 mol/mol. An excess of isocyanate groups is also needed in order to add a chain-extension step, as is well known to a person skilled in the art.

The mixture B2 of a polyurethane dispersion B21 and an aqueously dispersed alkyd resin B22 is obtained by mixing an aqueous polyurethane dispersion B21 and an aqueous dispersion of an alkyd resin B22.

Preferably, the aqueous polyurethane dispersion B21 has a mass fraction of solids of from 30% to 65%, a hydroxyl number of from 20 mg/g to 200 mg/g, corresponding to an average hydroxy functionality a) of at least 1.8 in the polyurethane molecules, b) a mass fraction of —NH—CO— groups (molar mass=43.02 g/mol) in the polyurethane of from 5% to 25%, c) a specific content of chemically incorporated anionic groups in the polyurethane of from 0 mmol/hg to 200 mmol/hg and d) a mass fraction of ethylene oxide units (molar mass=44.05 g/mol) of from 0% to 25%, in the polyurethane, which are incorporated within terminal and/or lateral polyether chains within the polyurethane, wherein either the groups c) or the groups d), or both, are chemically bound within the polyurethane in an amount which is sufficient to maintain the polyurethane stably dispersed in water. Preferably, a polyurethane dispersion as described as B1 is used.

Preferably, the aqueously dispersed alkyd resin B22 is as described in U.S. Pat. No. 4,333,865A1, especially preferred, that of U.S. Pat. No. 6,489,398 B1, particularly preferred that described in example A3 of the latter.

The mixtures according to the invention of at least one acrylic resin dispersion A and a second dispersion B which is at least one of a polyurethane dispersion B1 which comprises, in its polymer, moieties derived from grafted fatty acids, and a mixture B2 of a polyurethane dispersion B21 and an aqueously dispersed alkyd resin B22 can be used with preference to formulate coating compositions for wood and other porous materials such as paper, cardboard, leather, textiles, and concrete, but also plastics, glass, and metals.

Preferably, the mixtures comprise mass fractions of from 20% to 70% of acrylic resins A, and 80% to 30% of the polymer of the second dispersion B, where masses are always the mass of the solid resin present in the dispersion. In the case of B1, the mass fraction of moieties derived from grafted fatty acids in the polyurethane is preferably from 12% to 40%, particularly preferably from 15% to 35%, and especially preferred, from 20% to 30%. In the case of B2, the mass fraction of the alkyd resin in the sum of the mass of alkyd resin and polyurethane resin is preferably from 30% to 80%, particularly preferably from 40% to 70%, and especially preferred, from 50% to 60%.

The mixtures can be applied to substrates as is, or may be mixed with additives such as flow or levelling additives, defoamers, wetting agents, as well as with dyestuffs or pigments. Addition of commonly used siccatives such as those based on lead, cobalt or manganese, optionally in mixture with calcium, barium or zirconium salts, accelerates cross-linking by air-drying.

Mixtures according to the invention lead to good wood penetration, fast drying, low water spot formation propensity, and reduced dirt pick-up when used for wood coating.

Particularly good results have been obtained when mixtures have been made of aqueous dispersions of acrylic resins A and aqueous dispersions of the second polymer B, where the preferred compositions and ranges of parameters as claimed in the dependent claims have been combined.

EXAMPLES

Example 1 Preparation of an Acrylic Resin 800 g of deionised water were charged into a mixing vessel. A mixture of 102 g of an emulsifier (sodium salt of a fatty alcohol ether sulphate, Disponil® FES 32 P, Cognis GmbH), and a monomer mixture comprising 400 g of styrene, 400 g of methyl methacrylate, 900 g of butyl acrylate, 270 g of a solution comprising 67.5 g of 2-ethyl (2-oxoimidazolidin-1-yl) methacrylate and 202.5 g of methyl methacrylate, and 30 g of acrylic acid were added and stirred to form a homogeneous emulsion. A reactor was charged with 1600 g of deionised water and 12.2 g of the emulsifier mentioned supra, the contents were well stirred, and heated to 80° C. under a nitrogen blanket. An initiator solution comprising 36 g of water and 4 g of ammonium peroxodisulphate was added under stirring, and then, the monomer pre-emulsion was added over five hours. The reaction mixture was then held at 80° C. for one further hour, and then cooled to 60° C. Residual monomers were consumed by adding a further initiator solution of 1.14 g of tert.-butyl hydroperoxide and 6.68 g of water, and a solution of a reducing agent (1 g of the sodium salt of hydroxymethane sulfinic acid with 19 g of water) during thirty minutes of post-reaction. The reaction mixture was then cooled to 30° C. and neutralised by adding 16 g of a 25% strength solution of ammonia in water (25 g of $NH_3$ in 100 g of the solution). The resulting dispersion of acrylic resin had a viscosity (measured at 23° C. and 100 s⁻¹) of 200 mPa·s, a mass fraction of solids of 44%, a pH of 8.4, and a mass average of particle size of 110 nm.

Example 2 Preparation of an Oxydatively Drying Polyurethane Resin 2.1 (Grafted Fatty Acids)

71 g of linseed oil fatty acid were charged in a reactor and heated to 140° C. A monomer mixture consisting of 55 g of isobutyl methacrylate, 10 g of para-methyl styrene and 35 g of methacrylic acid together with 4 g of di-tert. butyl peroxide was added continuously over eight hours. The mixture was kept at 140° C. thereafter until a conversion to polymer of at least 99% had been reached, as witnessed by the mass fraction of solids measured. Finally, the reaction mixture was diluted with xylene. The solution had a mass fraction of solids of 75%, and an acid number of 203 mg/g.

2.2 (Polyol)

270 g of pentaerythritol, 150 g of phthalic anhydride and 1000 g of soy bean oil fatty acid were charged to a reactor and heated to 250° C. The mixture was kept under esterification conditions, viz., at a constant temperature of 250° C. under removal of water by azeotropic distillation with xylene until an acid number of approximately 4 mg/g or lower had been reached. The reactor was then cooled down to approximately 170° C., and 1000 g of the grafted fatty acid mixture of example 1 were charged to the reactor. The mixture was heated up to 205° C. and stirred at this temperature until the mixture was transparent (about twenty minutes). The reaction mixture was then cooled down to 170° C., and residual xylene was removed by distillation under reduced pressure until a mass fraction of solids of at least 99% had been reached. The mixture was kept at 170° C. under stirring until the final acid number of 50 mg/g was reached and then cooled down. The hydroxyl number of this polyol was in the range of from 36 mg/g to 44 mg/g when repeating this example, with an average of 40 mg/g.

2.3 (Polyurethane)

375 g of the polyol of example 2.2 were charged into a vessel together with 273 g of tetramethyl meta-xylylene diisocyanate (TMXDI) and heated to 90° C. The resulting reaction mixture was stirred at that temperature until the isocyanate concentration (mass fraction of isocyanate groups in the reaction mixture) was 1.5%. The prepolymer was cooled to 80° C., and 24.5 g of triethylamine were added. After fifteen minutes of homogenisation, 374 g of warm (40° C.) water were added within five minutes and subsequently to that, a mixture of 2.7 g of hydrazine and 47 g of water were added. The product was stirred for two hours at the resulting temperature and after that the formation of a polyurethane dispersion with a mass fraction of solids of 48% was complete. The dispersion had an acid number of 45 mg/g, a pH of a 10% strength dispersion in water of 8.8, a mass average particle size of 130 nm, and a dynamic viscosity of 900 mPa·s (measured at 23° C. and a shear rate of 10 s⁻¹).

Example 3 Mixture of Polyurethane and Alkyd Resin 3.1 Synthesis of a Polyurethane A mixture of 132.8 g of a polyester diol prepared from phthalic anhydride and hexanediol having a hydroxyl number of 56 mg/g, 5.0 g of a polyether monohydric alcohol having a hydroxyl number of 26.2 mg/g and prepared from n-butanol, and a mixture of 83 mol of ethylene oxide and 17 mol of propylene oxide, 13.4 g of neopentylglycol, 20.6 g of 2,2-dimethylolpropionic acid, and 90 g of N-methylpyrrolidinone was heated to 70° C. under stirring. To this mixture, 127.6 g of 4,4'-dicyclohexylmethane diisocyanate were added, and the resulting mixture was stirred and heated at 110° C. for one hour until the theoretical isocyanate content was reached. The reaction mixture was cooled to 70° C., and 15.6 g of triethylamine were added. After stirring for 15 minutes at 70° C., 17.0 g of ethanolamine and 50 g of N-methylpyrrolidinone were added. After the reaction mixture had reached 92° C. due to the exothermic reaction, the mixture was cooled to 70° C. and stirred until no more free NCO groups could be detected by infrared spectroscopy. 5.0 g of the above polyether monohydric alcohol in 50 g of N-methylpyrrolidone were then added, and the reaction mixture was stirred for thirty minutes. 391.3 g of distilled water with a temperature of 50° C. were added to the mixture, and the resulting dispersion was stirred for one hour. The following data were found: a pH of 9.3, a mass fraction of solids of 35%, an average hydroxy functionality per molecule of 2, and a mass fraction of NH—CO groups of 13%.

3.2 Synthesis of a Urethane-Modified Alkyd Resin 200 g of the grafted fatty acid of Example 2.1 were charged to a reactor, together with 67 g of trimethylol propane, and 140 g of sunflower oil fatty acid, and heated to 175° C. The mixture was kept under esterification conditions at a constant temperature of 175° C. under removal of water by azeotropic distillation with xylene until an acid number of approximately 65 mg/g had been reached. All solvent was then removed by distillation under reduced pressure. Within thirty minutes, 55 g of toluylene diisocyanate were added at 70° C., the temperature slowly rising due to the exothermic reaction to 100° C. At this temperature, the reaction was continued until a Staudinger index of 8.5 cm³/g had been reached. Additional diisocyanate was added if there was need, when repeating this experiment, care being taken that no residual free isocyanate was left after reaching the desired value of the Staudinger index. Then, the solid resin was emulsified by adding 610 ml of water and 15 g of an aqueous ammonia solution of 25% strength, yielding an aqueous emulsion of the binder with a mass fraction of solids of 40%, a dynamic viscosity measured at 23° C. and a shear rate of 10 s⁻¹ of 3500 mPa·s, an average particle size of 120 nm, an acid number of 52 mg/g, and a pH of 8.8, measured at 10% strength in water.

3.3 Preparation of a Mixture of Polyurethane and Alkyd Resin 445 g of the polyurethane dispersion of example 3.1 and 555 g of the urethane-modified alkyd resin dispersion of example 3.2 were stirred for thirty minutes in a resin kettle. A homogeneous dispersion was obtained.

Example 4 Application Test 4.1 Mixture of the Polyurethane Dispersion of Example 2 and Acrylic Resin Dispersion of Example 1

300 g of the acrylic dispersion of example 1 and 700 g of the polyurethane dispersion of example 2 were mixed in a resin kettle under stirring until a homogeneous dispersion was obtained.

4.2 Mixture of the Polyurethane/Alkyd Dispersion of Example 3 and Acrylic Resin Dispersion of Example 1

300 g of the acrylic dispersion of example 1 and 700 g of the mixed polyurethane/alkyd dispersion of example 3 were mixed in a resin kettle under stirring until a homogeneous dispersion was obtained.

4.3 Acrylic-Modified Alkyd Resin Dispersion (Comparative)

An alkyd resin dispersion was made according to example 1.3, resin dispersion B1, of U.S. Pat. No. 5,698,625.

4.4 Application Test Results

The dispersions according to examples 4.1, 4.2, and 4.3 (comparative) were formulated into paints P1, P2, and P3 by adding, to 56 g each of the dispersions, 1.8 g of a red pigment (Pigment Red 101), 1.7 g of a yellow pigment (Pigment Yellow 42), 0.04 g of a black pigment (Pigment Black 7/77266), and 38 g of water. In the case of paints P1 and P2, 0.6 g of a water-emulsifiable combination drier free of nonylphenol ethoxylate comprising organic salts of cobalt, lithium, and zirconium was added, and 0.9 g of the same drier was added to paint 4.3.

These paints were applied in two coats with drying (7 days) after each application to pressure treated pine having a residual humidity of less than, or equal to, a mass fraction of water of 5%. In the first coat, a wet film thickness of 107 µm (380 sq ft/gal) was applied, dried for 7 days, and then, the second coat with a wet film thickness of 73 µm (560 sq ft/gal) was applied, and dried again for 7 days.

Chemical resistance against vinegar, and household bleaching agents was OK in all cases, on singly coated pine (7 days drying). The dry time was determined as the time when no colour was removed after blotting the coating at the specified time:

|  | P1 | P2 | P3 (comp.) |
|---|---|---|---|
| Dry time - 1st coat | 9 min | 12 min | 13 min |
| Dry time - 2nd coat. | 9 min | 11 min | 18 min |
| Residual tack After Drying | 4 | 4 | 2 |
| Residual Tack after ninety minutes | 4 | 4 | 2 |

Tack was judged according to the following list: 0: sticky; 1: strong tack; 2: tack; 3: mild tack; 4: very mild tack; 5: no tack Additional to the fast drying behaviour found with both inventive paints P1 and P2 compared to P3, a significant and unexpected improvement was found in the dirt pick-up behaviour where two coats of paints P1, P2 and P3 each were applied to pressured-treated pine, each layer having been dried for 7 days. The coated boards were then preheated to 104° F. (40° C.), and a red iron oxide slurry was applied in a wet film thickness of 73 µm (560 sq ft/gal) and let stand for four hours, whereafter the slurry was washed away with water and a brush, and the surface judged visually (5: no damage; 4: very mild damage; 3: mild damage; 2: damage and mild discolouration; 1: damage and strong discolouration; 0: strong damage). Paint P1 had a rating of 4 to 5, paint P2 had a rating of 3, and paint P3 (comparative) had a rating of 2.

These data confirm that the binder mixtures according to the invention show very satisfactory and unexpected results particularly for the use as deck stain.

The invention claimed is:

1. A process for the preparation of mixtures of at least one acrylic resin dispersion A and a second dispersion B, where B is at least one of dispersion B1 and dispersion B2, where said dispersion B1 is a polyurethane dispersion comprising, in its polymer, moieties derived from grafted fatty acids which grafted fatty acids have at least 1.1 acid groups per molecule, and said dispersion B2 is a mixture of a polyurethane dispersion B21 and an aqueously dispersed alkyd resin B22, the process comprising the following steps:
preparing at least one of said dispersion B1 and said dispersion B2,
wherein the dispersion B1 is prepared in a multi-step reaction where
in a first step, a fatty acid having at least one olefinic unsaturation is grafted with a mixture of olefinically unsaturated monomers which mixture comprises at least one acid-functional olefinically unsaturated monomer, to provide a grafted fatty acid having on average at least 1.1 acid groups per molecule,
in a second step, a compound which is hydroxyfunctional is made by reacting with the grafted fatty acid at least one polyhydric alcohol having at least two hydroxyl groups, and at least one fatty acid, and
in a third step, a polyurethane is made by reacting the hydroxy functional compound with a polyfunctional isocyanate wherein the ratio n(—NCO)/n(—OH) of the amount of substance n(—NCO) of isocyanate groups in the polyfunctional isocyanate to the sum of the amounts of substance n(—OH) of hydroxyl groups in the hydroxyfunctional compounds employed in the third step is at least 1.05 mol/mol, and
in a further step, the product of the third step is reacted with at least one chain extender having at least two functional groups that react with isocyanate groups, and
wherein the dispersion B21 is prepared in a multi-step reaction where
in a first step, a fatty acid having at least one olefinic unsaturation is grafted with a mixture of olefinically unsaturated monomers which mixture comprises at least one acid-functional olefinically unsaturated monomer, to provide a grafted fatty acid having on average at least 1.1 acid groups per molecule,
in a second step, a compound which is hydroxyfunctional is made by reacting with the grafted fatty acid at least one polyhydric alcohol having at least two hydroxyl groups, at least one fatty acid, and optionally, at least one polyfunctional acid having at least two acid groups, and/or an anhydride thereof, and
in a third step, a polyurethane is made by reacting the hydroxy functional compound with a polyfunctional isocyanate wherein the ratio n(—NCO)/n(—OH) of the amount of substance n(—NCO) of isocyanate groups in the polyfunctional isocyanate to the sum of the amounts of substance n(—OH) of hydroxyl groups in the hydroxyfunctional compounds employed in the third step has to be at least 1.05 mol/mol, and
in a further step, the product of the third step is reacted with at least one chain extender having at least two functional groups that react with isocyanate groups to yield polyurethane dispersion B21 which has a mass fraction of solids of from 30% to 65%, a hydroxyl number of from 20 mg/g to 200 mg/g, a specific content of chemically incorporated anionic groups of from 0 mmol/hg to 200 mmol/hg, and a mass fraction of ethylene oxide units of from 0% to 25% which are incorporated within terminal or lateral polyether chains within the polyurethane, preparing a mixture of the dispersion B21 and the aqueously dispersed alkyd resin B22 to obtain the dispersion B2, and mixing the at least one acrylic resin dispersion A and at least one of the second dispersions B1 and B2 to obtain a mixture.

2. The process of claim 1 wherein the mixtures comprise mass fractions of from 20% to 70% of acrylic resins present in the at least one acrylic resin dispersion A, and 80% to 30% of the polymer of the second dispersion B, where masses are always the mass of the solid resin present in the dispersion.

3. The process of claim 1 wherein the polymer of the second dispersion B is the polymer of the polyurethane dispersion B1 which comprises a mass fraction of moieties derived from grafted fatty acids in the polyurethane of from 12% to 40%, where masses are always the mass of the solid resin present in the dispersion.

4. The process of claim 1 wherein the polymer of the second dispersion B is a mixture of the polymers present in dispersion B2 which is a mixture of the polyurethane resin present in the polyurethane dispersion B21 and of the alkyd resin present in the aqueously dispersed alkyd resin B22, and wherein the mass fraction of the alkyd resin in the sum of the mass of alkyd resin and polyurethane resin is from 30% to 80%.

5. The process of claim 4 wherein the aqueously dispersed alkyd resin B22 comprises moieties derived from grafted fatty acids, and wherein the mass fraction of moieties derived from grafted fatty acids in the dispersion B2 is from 12% to 40%, where masses are always the mass of the solid resin present in the dispersion.

6. The process of claim 1 wherein the acrylic resin dispersion A has a minimum film forming temperature of less than 35° C., corresponding to a glass transition temperature of up to 30° C., a hydroxyl number of from 0 mg/g to 50 mg/g, and an acid number of from 2 mg/g to 25 mg/g, which are made by emulsion copolymerisation of at least two olefinically unsaturated monomers A1 and A2.

7. The process of claim 6 wherein the monomers A1 are selected from the group consisting of olefinically unsaturated monomers A1 selected from the group consisting of esters A11 of olefinically unsaturated carboxylic acids with monohydroxy compounds such as aliphatic linear branched, or cyclic alcohols, of olefinically unsaturated aromatic compounds A12 having at least one olefinically unsaturated aliphatic substituent on an aromatic residue derived from optionally substituted aromatic compounds by removal of a hydrogen atom bonded to an aromatic ring, of olefinically unsaturated esters A13 of an unsaturated aliphatic alcohol and a saturated aliphatic carboxylic acid, of ethers A14 of the formula $R^1$—O—$R^2$, wherein both $R^1$ and $R^2$ are linear or branched aliphatic radicals having from one to twenty carbon atoms, and at least one of $R^1$ and $R^2$ is olefinically unsaturated in which case the number of carbon atoms is at least two, of unsaturated aliphatic ketones A15 of the formula $R^3$—CO—$R^4$, wherein both $R^3$ and $R^4$ are linear or branched or cyclic aliphatic radicals having from one to twenty carbon atoms, and at least one of $R^3$ and $R^4$ is olefinically unsaturated in which case the number of carbon atoms is at least two, and of unsaturated aliphatic halogenides and nitriles A16 of the formula $R^5$—X where X is F, Cl, Br, I, or CN, and $R^5$ is an unsaturated aliphatic radical having from two to twenty carbon atoms, where it is also possible that more than one hydrogen atom of the olefinically unsaturated aliphatic compound $R^5$—H are substituted by the atoms or groups X.

8. The process of claim 6 wherein the monomers A2 have additional functionalities next to being olefinically unsaturated, which functionalities are selected from the group consisting of acid, hydroxyl, and acid amide, where the acid functionalities are carboxylic acid —COOH, sulphonic acid-$SO_2OH$, sulphuric acid —O—$SO_2OH$, phosphonic acid —PP(OH)$_2$, phosphoric acid —O—PO(OH)$_2$, and the acid amide functionalities are those of the corresponding amides.

9. The process of claim 1 wherein, in the dispersion B2 which is the mixture of the polyurethane dispersion B21 and the aqueously dispersed alkyd resin B22, the aqueous polyurethane dispersion B21 has a mass fraction of solids of from 30% to 65%, a hydroxyl number of from 20 mg/g to 200 mg/g, corresponding to an average hydroxy functionality a) of at least 1.8 in the polyurethane molecules, b) a mass fraction of —NH—CO— groups, calculated with a molar mass of from 43.02 g/mol, in the polyurethane of from 5% to 25%, c) a specific content of chemically incorporated anionic groups in the polyurethane of from 0 mmol/hg to 200 mmol/hg and d) a mass fraction of ethylene oxide units, calculated with a molar mass of from 44.05 g/mol, of from 0% to 25%, in the polyurethane, which are incorporated within terminal and/or lateral polyether chains within the polyurethane, wherein either the groups c) or the groups d), or both, are chemically bound within the polyurethane in an amount which is sufficient to maintain the polyurethane stably dispersed in water.

10. The process of claim 1 wherein a siccative is added to the mixture of the at least one acrylic resin dispersion A and the second dispersion B.

11. A method of use of the mixtures obtained by the process of claim 1 to prepare a coating composition by admixing a siccative, and at least one of pigments, defoamers, levelling agents, antisettling agents, antiskinning agents, and sag control agents, and applying the coating composition to a substrate selected from the group consisting of wood, leather, paper, cardboard, concrete, and plaster.

* * * * *